Oct. 9, 1934.                L. O. BIRD                 1,976,597
                      TRACTOR PROPELLED IMPLEMENT
                  Filed Aug. 8, 1933        3 Sheets-Sheet 1
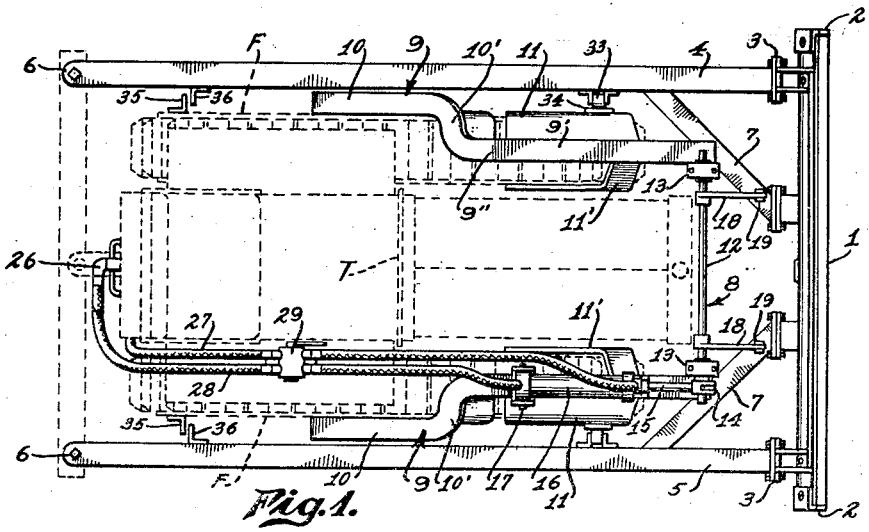
Fig. 1.
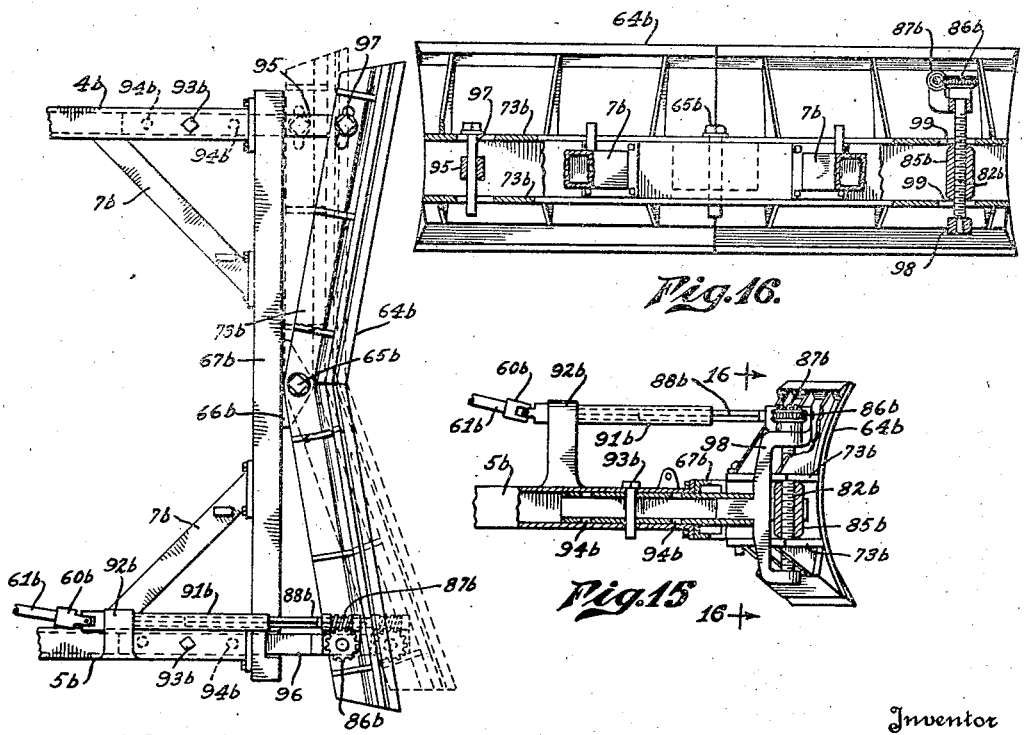
Fig. 16.
Fig. 15.
Fig. 14.
Inventor

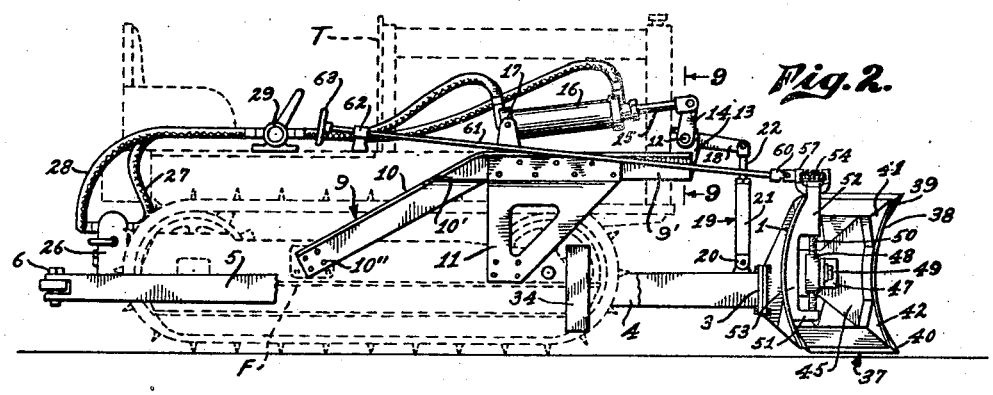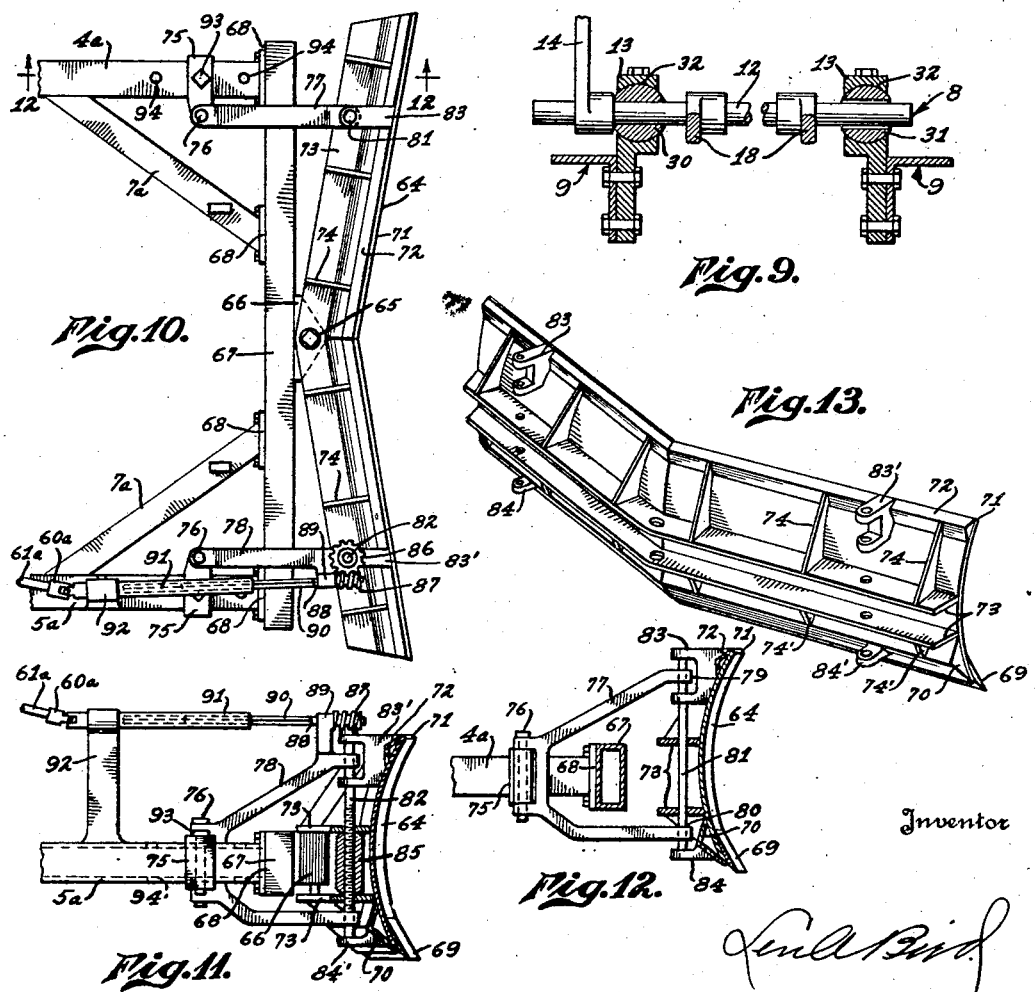

Oct. 9, 1934.　　　　L. O. BIRD　　　　1,976,597
TRACTOR PROPELLED IMPLEMENT
Filed Aug. 8, 1933　　　3 Sheets-Sheet 3
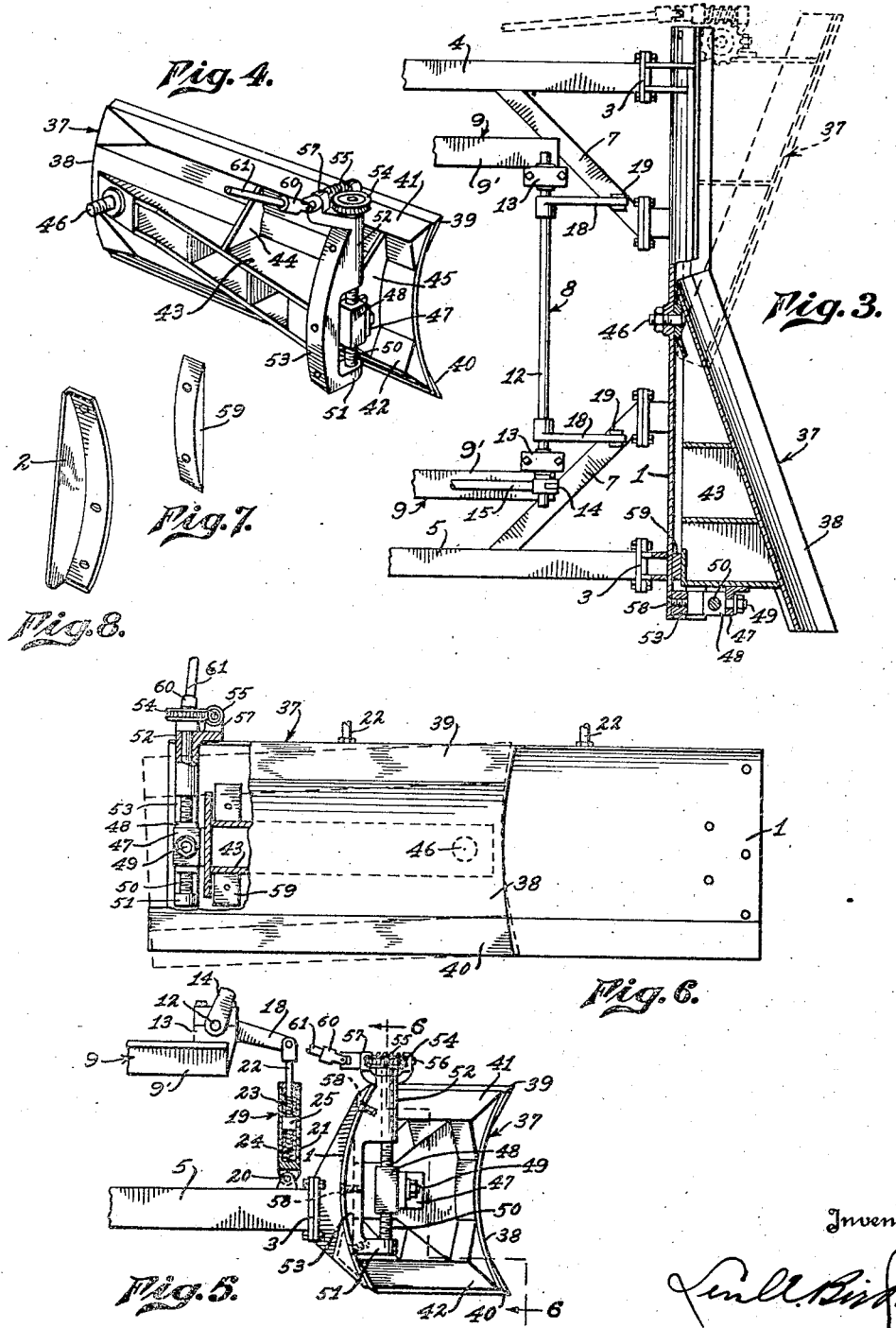

Patented Oct. 9, 1934

1,976,597

UNITED STATES PATENT OFFICE 1,976,597

TRACTOR PROPELLED IMPLEMENT

Len O. Bird, Glendale, Calif., assignor to W. L. Adams, Rexburg, Idaho

Application August 8, 1933, Serial No. 684,215

7 Claims. (Cl. 37—144)

This invention relates to tractor propelled implements and has for its particular object the provision of an implement in which the blade member is adaptable to a greater class range of material moving work than has heretofore been possible in a single implement, thus eliminating the need for several implements, thereby effecting a saving in both the initial investment and the maintenance costs.

Another object is the provision of an implement in which the blade member is of a character permitting a more efficient performance throughout its entire class range of material moving work than has heretofore been possible in implements used only for individual classes of material moving work.

A further object is the provision of an implement in which the operative and inoperative positions of the blade member are controlled by means of an extremely simple and positive yet highly flexible lifting and lowering device which together with a transverse tilting mechanism at one end of the blade member permits quick and efficient adjustment of the implement from the operators position to meet effectively various conditions encountered during an operating period without stopping the tractor.

Another object is the provision of an implement which may be used for a variety of purposes, such as, snow removing, scraping, leveling, side casting, back filling, bulldozing, road maintaining, trail building, etc., by simply adjusting the blade member to the suitable positions.

As a further object, it provides a simple and compact yet substantial power controlled implement in which the blade member is adaptable to a multiplicity of classes of material moving work and may be raised and lowered for clearing obstructions, transporting from place to place, and controlling the depth of operation together with the angle of the blade member with respect to the ground surface, quickly and efficiently with a minimum of power and very little strain on the vital parts of the tractor and the control mechanism of the implement.

This invention is an improvement and a new adaptation of the reversible blade shown and described in my co-pending application for patent filed Feb. 1, 1933, Serial No. 654,577.

With these and other objects in view the invention consists in the combination, correlation and construction of parts, members and features which will be described in the specification and will be finally pointed out in the claims.

Referring to the drawings:

Figure 1 is a plan view of the device embodying my invention.

Figure 2 is a side elevation of Figure 1 illustrating the wing blade attachment in place.

Figure 3 is a fragmentary plan view, partly in section, of the forward end of the device with wing blade attachment in place.

Figure 4 is a perspective view of the wing blade attachment.

Figure 5 is a fragmentary side elevation of Figure 3.

Figure 6 is a fragmentary front elevation, partly in section as indicated by lines 6—6 in Figure 5.

Figure 7 is a detail of a thrust block.

Figure 8 is a detail of an end plate.

Figure 9 is a section on line 9—9 of Figure 2.

Figure 10 is a fragmentary plan view of a modified form of the device.

Figure 11 is a side elevation, partly in secton, of Figure 10.

Figure 12 is a section on line 12—12 of Figure 10.

Figure 13 is a perspective view of the modified blade member.

Figure 14 is a fragmentary plan view of another modification.

Figure 15 is a side elevation, partly in section, of Figure 14.

Figure 16 is a section on line 16—16 of Figure 15.

Referring to Figures 1 to 9 inclusive:

The plan view of the implement in Figure 1 illustrates a straight bulldozer blade 1 having at its ends removable side wings 2. The blade 1 is secured near its ends, as shown at 3, to rearwardly extending thrust members 4 and 5 which in turn may be connected at their rear ends, as at 6, to a tractor or any other suitable vehicle. Reinforcing members 7 are used to insure rigidity of the forward end of the implement.

The operative and inoperative positions of the implement are controlled by a lifting and lowering device 8 which is mounted on the forwardly projecting ends of fabricated cantilever brackets 9.

Each cantilever bracket 9 consists of a forwardly projecting horizontal member 9' having its rear end bent downward, as at 9'', to form a diagonal brace 10 which is secured to the outer side of tracklayer frame F as shown at 10''. The diagonal brace 10 is formed, as shown at 10', so that the horizontal member 9' is directly over the tracklayer, thus it can be effectively supported at both the outer and the inner sides of the tracklayers frame F on the supporting member 11 and the bracing member 11', respectively.

The lifting and lowering device 8 consists of a counter shaft 12 journaled near its ends in bearings 13 mounted on the forwardly projecting ends of the cantilever brackets 9. At one end of the counter shaft 12 is a crank lever 14 which connects to the piston rod 15 of the hydraulic power unit 16, which in turn is mounted on one of the cantilever brackets 9, as shown at 17. Two crank arms 18 secured to the counter shaft 12 are connected to the reinforcing members 7 through resilient means 19, as illustrated at 20.

Each resilient means 19 consists of a tubular member 21 within which slides a rod 22 connected at its upper end to the crank arm 18, see Figure 5. Springs 23 and 24 located within the tubular member 21, above and below the stop member 25 on the rod 22, dampen the shocks resulting from abruptly raising and lowering the blade 1 out of and into the ground, respectively.

Fluid under pressure from pump 26 is conducted through hose lines 27 and 28 to the hydraulic power unit 16 and is controlled by valve 29 within said hose lines to actuate the lifting and lowering device.

In practice the tracklayer units of a tractor are designed to have a certain amount of individual vertical oscillation about the drive shaft which enables the front ends of the units to raise and lower independently of each other and which of course imparts severe twisting and bending strains to the counter shaft 12. To relieve these strains the counter shaft 12 is provided with balls 30 and 31 which are mounted within sockets 32 in bearings 13. The ball 30 is located near the crank lever 14 and is secured to the counter shaft 12 by welding or other suitable means, to keep the crank lever 14 substantially in alignment with the hydraulic power unit 16. The ball 31 at the other end of shaft 12 has a slidable engagement with said shaft to relieve the cramping and binding during the period of oscillation.

To keep the thrust members 4 and 5 from interfering with the tracklayers, rollers 33 mounted on said thrust members are adapted to engage rub plates 34 on the tracklayer frames F.

Stop members 35 and 36 are mounted near the rear end on tracklayer frames F and the thrust members 4 and 5, respectively, to assist the draw bar in pulling unevenly balanced loads.

It has been found in practice when using an implement having a straight blade set at an angle for side casting, back filling, etc., that it has a tendency to deflect the implement and tractor from the course of travel during an operating period, resulting in excessive wear on the vital parts of the tractor, especially the clutches. By using a reversible wing blade attachment 37, as illustrated in Figure 3, this condition is remedied to a great extent since only about half of the entire blade area is at an angle to the line of travel. The other half of the blade area being part of the bulldozer blade 1 and set at right angle to the line of travel enables a comparatively greater amount of material to pile up ahead of it prior to casting it aside, thus tending to balance the deflecting effect.

The reversible wing blade attachment 37 consists of a blade member 38 having two cutting edges 39 and 40 which are reinforced longitudinally by means of angles 41 and 42 welded to the blade member. The blade member 38 is mounted on a boxed frame 43 and is reinforced by webs 44 and 45.

The tapering end of the reversible wing blade attachment 37 is pivoted at the center of the bulldozer blade 1, as shown at 46. The outer end of the attachment 37 carries a transverse tilting mechanism comprising a bracket 47 on which a nut 48 is pivotally mounted, as shown at 49. A lead screw 50 engaging the nut 48 and journalled in bearings 51 and 52 on the bracket 53 carries at its upper end a worm gear 54 which in turn meshes with the worm 55 on the shaft 56 journaled in bearings 57 at the top of bracket 53.

The bracket 53 is mounted within the concave side of the bulldozer blade 1, at the end thereof, and is retained in place by screws 58 which are also used for attaching end plates 2 to the ends of said blade 1.

A thrust block 59 is mounted within the concave side of the blade 1 near the bracket 53, upon which the end of the boxed frame 43 bears, to prevent thrusts and stresses of operating loads from being imparted to lead screw 48 of the tilting mechanism.

It will be noted that the end plates 2 are used only when blade 1 is used for bulldozing. When the reversible wing blade attachment 37 is used both side plates 2 are removed.

A crank or hand wheel (not shown) may be mounted directly on the shaft 56 for transversely tilting blade 38. In this instance however, it is desirable to provide a universal joint 60 for connecting shaft 56 to rod 61 which in turn extends rearwardly and is journaled in the swivel bearing 62 mounted on the tractor T, and carries at its end the hand wheel 63. This permits the blade 38 to be tilted transversely from the operators position.

Dotted lines in Figure 3 illustrate the wing blade attachment 37 set for side casting from the opposite side of the tractor.

Refering to Figures 10 to 13 inclusive:

It has been found in practice, when using a straight bulldozer blade, that some times the material tends to pile up unevenly in front of the blade, which of course creates a greater load on one end of the blade than on the other, thus tending to deflect the implement and tractor from its course of travel and thereby resulting in excessive wear on the vital parts of the tractor, as has been pointed out above.

By using a shallow V type blade 64, as illustrated in Figure 10, this condition is remedied to a great extent. It will be noted that the blade 64 is set so that the sides of the V are at equal angles to the line of travel, this will cause the material to be deflected towards the center of the blade where it will accumulate, thus tending to equalize the load.

The blade 64 is reversible so that it can be used for side casting, back filling, etc., by swinging it about the pivot 65 in the block 66 on the transverse cross member 67 which in turn is secured to the trust members 4a and 5a and the reinforcing members 7a, as shown at 68.

The blade 64 is reinforced longitudinally along the cutting edge 69 by an angle 70 and along the upper edge 71 by an angle 72, both of which are welded to the back of the blade. The longitudinal webs 73 and the vertical webs 74 and 74' are welded to the back of the blade 64, as illustrated in Figure 13, to further reinforce said blade.

Near the forward ends of thrust members 4a and 5a and slidably mounted thereon are collars 75 on which are hinged, as shown at 76, the forwardly projecting yokes 77 and 78. The ends of the yokes 77 and 78 are slidably mounted, as at 79 and 80, on the spindles 81 and 82.

The spindle 81 is fixed in the brackets 83 and 84, which are secured to the back of blade 64, and in the longitudinal reinforcing members 72.

The spindle 82 is journaled in the brackets 83' and 84' and is threaded along its intermediate portion to engage a nut 85 which in turn is retained in place between the longitudinal members 73. A worm gear 86 is secured to the upper end of the spindle 82 and meshes with a worm 87 on the shaft 88 which in turn is journaled in the bearing 89 on the yoke 78. The shaft 88 has a squared portion 90 adapted to slide within the sleeve 91 which in turn is journaled in the bracket 92 on the thrust member 5a. A universal joint 60a connects the sleeve 91 to the rod 61a which leads to the operators position, as illustrated in the preferred form of the device in Figure 2.

By rotating rod 61a rotary motion is transmitted to the spindle 82, thus by virtue of the nut 85 on its threaded portion and between the members 73 the blade 64 is tilted about the block 66, there being enough clearance between the associated parts of pivot 65 to permit considerable tilting of said blade.

The slidable collars 75 are retained in place by pins 93 which pass through the holes 94 in the thrust members 4a and 5a. The blade 64 may be adjusted for bulldozing or side casting to either side by removing pins 93 and swinging it about pivot 65 to the desired position then locking it in place by reinserting the pins 93 in corresponding holes 94.

Referring to Figures 14 to 16 inclusive:

In Figures 14 to 16 inclusive, a modified form of adjusting device for blade 64b is illustrated. In this instance members 95 and 96 are adapted to slide within the hollow thrust members 4b and 5b and are retained in the various positions by pins 93b which pass through holes 94b.

The slide member 95 is slidably engaged through the pin and slot connection 97 with the longitudinal reinforcing members 73b at one end of the blade 64b.

The slide member 96 has at its forward end the bracket 98 which carries the threaded spindle 82b which in turn engages the nut 85b located between the reinforcing members 73b. Slots 99 in the members 73b provide the necessary clearance for the spindle 82b.

All other parts corresponding to the form illustrated in Figures 10 to 13 inclusive, have the same identifying numbers with the character b added.

Having thus described my invention I claim:

1. An implement comprising forwardly extending thrust members connected at their rear ends to a tractor, a transverse blade member secured to the forward ends of said thrust members, a reversible wing blade pivoted near one end to the center of said transverse blade member and inclined forward from said pivot at an angle with respect to said transverse blade member, means mounted on said transverse blade and connected to the outer end of said wing blade for transversely tilting same, a lifting and lowering device flexibly mounted on cantilever brackets secured to the tracklayer frames of said tractor and connected to the forward end of said implement, means for actuating said lifting and lowering device.

2. An implement comprising forwardly extending thrust members connected at their rear ends to a tractor and supporting at their forward ends a transverse blade member, removable side wings on said blade member, a reversible wing blade pivoted near one end to the center of said transverse blade member and inclined forward from said pivot at an angle with respect to said transverse blade, means mounted on said transverse blade and connected to the outer end of said wing blade for transversely tilting same about said pivot, a thrust block for said wing blade mounted on said transverse blade, two cutting edges on said wing blade, a lifting and lowering device flexibly mounted on cantilever brackets secured rigidly to the tracklayer frames of said tractor, shock absorbing means connecting said lifting and lowering device to the forward end of said implement, means for actuating said lifting and lowering device to control the depth of operation of said implement.

3. An implement as described in claim 2 in which the lifting and lowering means comprises a counter shaft having a ball member rigidly secured thereto near one end and a ball member slidably mounted thereon near the other end, socket bearings for said balls mounted on the forwardly projecting ends of cantilever brackets secured to the tracklayer frames of a tractor, crank arms secured to said counter shaft, shock absorbing means connecting said crank arms to the forward end of said implement, means for actuating said counter shaft to raise and lower said implement.

4. An implement as described in claim 2 in which the cantilever brackets comprise forwardly projecting horizontal members having their rear ends inclined downward to form diagonal braces which are secured at the ends to the tracklayer frames of a tractor, supports for said horizontal members at both sides of said tracklayer frames.

5. An implement as described in claim 2 in which the shock absorbing means connecting the lifting and lowering device to the forward end of said implement comprise tubular members pivotally connected to said forward end of said implement, rods adapted to slide within said tubular members and connected at their upper ends to said lifting and lowering device, a stop member on each of said rods and within said tubular membrs, springs above and below each stop member within said tubular members for absorbing shocks resulting from abruptly lifting or lowering said implement.

6. An implement as described in claim 2 in which the wing blade member is reinforced longitudinally along both cutting edges by means of structural angles and at an intermediate point between said cutting edges by longitudinal spaced apart webs welded to the back of said wing blade, and reinforcing ribs extending at right angles from said longitudinal webs to both of the cutting edges.

7. An implement as described in claim 2 in which the transverse tilting mechanism consists of a bracket removably secured to the transverse blade, a vertical lead screw journaled in said bracket, a nut or follower engaging the threaded portion of said lead screw and pivotally secured to the outer end of the wing blade, a worm gear at the upper end of said lead screw, a worm meshing with said worm gear and secured to a shaft journaled in bearings on said bracket, a universal joint connecting said shaft to a rearwardly extending rod which carries at its end and within the reach of the operator a hand wheel.

LEN O. BIRD.